Aug. 21, 1962 C. H. BARKELEW 3,049,891
COOLING BY FLOWING GAS AT SUPERSONIC VELOCITY
Filed Oct. 21, 1960 2 Sheets-Sheet 1

INVENTOR:
CHANDLER H. BARKELEW
BY: *Oswald Td Milmore*
HIS ATTORNEY

INVENTOR:
 CHANDLER H. BARKELEW
BY: *Oswald H. Milmore*
 HIS ATTORNEY

United States Patent Office 3,049,891
Patented Aug. 21, 1962

3,049,891
COOLING BY FLOWING GAS AT SUPERSONIC VELOCITY
Chandler H. Barkelew, Orinda, Calif., assignor to Shell Oil Company, New York, N.Y., a corporation of Delaware
Filed Oct. 21, 1960, Ser. No. 64,121
12 Claims. (Cl. 62—86)

The invention relates to the generation of cold by expanding gas through a supersonic nozzle and transferring heat from a fluid stream to be cooled to the gas flowing at supersonic speed. The said fluid stream may be liquid or gaseous and may be distinct from or derived from the supersonic gas itself, and when so derived the invention may be regarded as involving the separation of a gas into relatively warmer and colder fractions.

It is known to generate cold by expanding a gas with gyratory motion within a vortex tube, wherein the gas forms hot and cold fractions moving respectively near the tube periphery and at the core. Although such tubes perform well it is necessary, for attaining good efficiency, to design the flow passages with precision, so as to attain the inlet velocities close to the velocity of sound and to maintain the desired flow patterns. Velocities above local sonic velocity are not feasible in vortex tubes because such velocities would lead to shock waves when the gas decelerates to sonic velocity.

A further limitation of vortex tubes is the difficulty in transferring the cold to a process stream other than the gas. This can in practice be accomplished only by flowing the cold gas fraction after discharge from the tube through a heat exchanger, or by flowing the process stream through a duct which extends through the core at the central axis thereof. The former expedient involves complexity in piping while the latter interferes with efficient operation due to retarding of the vortical velocity within the vortex tube.

Further, vortex tubes are not usually capable of sustained and efficient operation with gas which contains suspended solids, or wherein condensation of vapor occurs, because of abrasion of the tube, especially near the tangential feed ports. Such gas is encountered in the exhaust of some industrial processes. Moreover, condensation within the cold core would result in splashing of liquid to the hot, outer wall, causing transfer of cold to the wall and thereby decreasing the efficiency.

It is an object of the invention to provide a method and apparatus for generating cold from a gas by expansion thereof which does not depend upon vortical flow patterns.

A further object is to provide a method and apparatus for separating a gas stream into relatively warmer and colder fractions by expansion through a nozzle by which the gas is made to flow at supersonic speed.

Another object is to provide an improved method and apparatus for cooling a fluid stream by expanding a gas through a nozzle to flow at supersonic speed and transferring heat from the said stream to the gas.

Still other objects, ancillary to the foregoing, are to improve the transfer of heat from gas flowing at supersonic speed to a heat exchange wall which separates the said gas from a fluid stream which may be the same as or different from the said gas; and to permit operation with gas which contains entrained solids or within which liquid can condense upon cooling.

In summary, according to the invention a gas stream is accelerated to supersonic velocity, e.g., by flow through a convergent-divergent nozzle, thereby attaining a sharp fall in the gas temperature, and the supersonic gas stream is flowed adjacently to a heat exchange wall in indirect heat exchange with a fluid stream to be cooled.

In one specific embodiment the supersonic gas stream, after such heat-exchange, is passed through a shock wave at which sub-sonic velocity is established and at least a portion of the gas is passed in heat exchange with the supersonic gas stream to form the said fluid stream to be cooled. The remaining part, if any, of the gas is separately discharged. By regulating the ratio between the parts of the gas passed in heat exchange and separately discharged the temperature of the former can be controlled.

In another embodiment the fluid stream to be cooled is separate from the gas which is brought to supersonic velocity and may be, for example, a vapor or liquid.

According to a feature of the invention which can be applied to either of the two embodiments just mentioned, the heat transfer between the heat exchange wall and the colder supersonic gas stream is improved by dispersing small particulate bodies in the gas, whereby heat will be radiated from the said wall to the bodies.

It is known that when a gas is accelerated to supersonic velocity it undergoes a sharp drop in temperature. However, this low temperature prevails only in the rapidly moving gas and not in the boundary layers of the gas adjoining the heat exchange wall, which form a stagnant zone. For this reason only a negligible heat transfer between the said wall and the gas was expected and it was not, prior to the invention, believed that this technique could lead to practicable cooling of the wall. It was, however, found by actual tests that significant cooling of the heat exchange wall occurs.

Heat transfer between the supersonic gas stream and the heat exchange wall can be improved by entraining small solids in the gas stream, these solids and the heat exchange wall being advantageously selected to produce good radiation of heat between them. The particle size of such solids is important and is carefully selected with the following considerations in view: Small particles, e.g., of diameters from 1 to 50 microns and, preferably, 1–5 microns, are more effective in regard to the heat radiated per unit mass, but larger particles, e.g., up to several hundred microns in diameter, are more readily separated from the gas, and could be used when subsequent separation is essential. In general, the smaller diameters are preferred because they can be used in lesser amounts, thereby interfering less with the supersonic flow patterns and the acceleration of the gas to supersonic velocity and increasing to a lesser extent the heat capacity of the gas. On the other hand, particles smaller than the wave length of the radiations—of the order of one micron for usually encountered temperatures—should not be used. Finely divided carbon black with diameters from 1–5 microns are preferred.

The invention will be described further in connection with the accompanying drawing forming a part of this specification and showing certain preferred embodiments, wherein.

Figure 1:
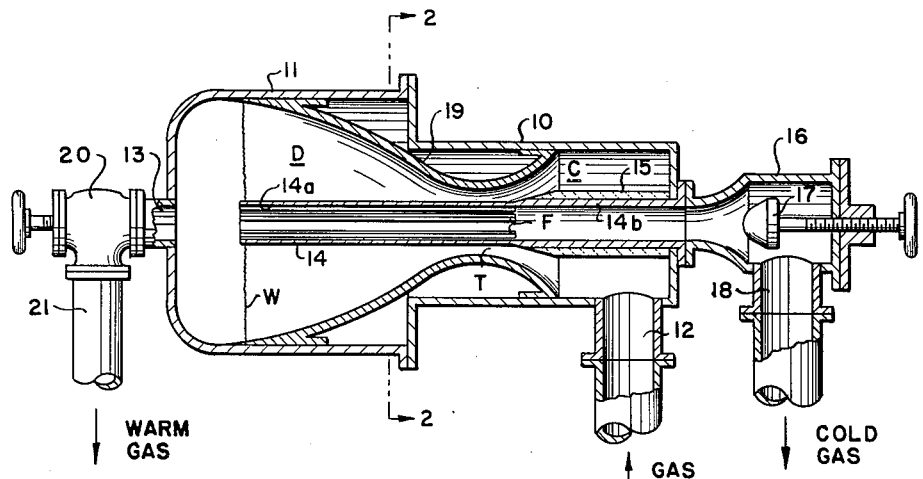
FIGURE 1 is a sectional view through a cooling device wherein an initial gas stream is separated into relatively warmer and colder fractions.
Figure 2:
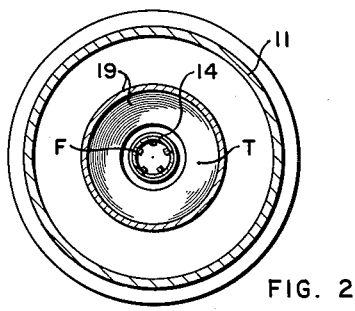
FIGURE 2 is a transverse sectional view, taken on the line 2—2 of FIGURE 1.

Referring to FIGURES 1 and 2 there is shown a shell comprising cylindrical sections 10 and 11 and having a gas inlet 12 near one end and a gas outlet 13 at the other. Extending into the shell from the gas inlet end at the central axis thereof is a gas outlet or heat exchange tube 14 the inner end 14a of which is advantageously thin-walled and made of metal having a high thermal conductivity, such as copper. For structural reasons the outer end 14b is made thicker. A layer of thermal insulation 15 surrounds the outer end of the tube. The inside of the tube is advantageously provided with fins F to promote heat transfer. The discharge tube is connected to a suitable throttling device, such as a casing 16 containing an axially adjustable valve member 17 and having an outlet pipe 18.

The shell contains a nozzle insert 19 which cooperates with the tube 14 to form a supersonic nozzle providing an annular flow passage which includes a convergent section C, a throat T and a divergent section D. The section D is preferably longer and more gradually divergent than the convergent section. It is desirable to make the shell section 11 larger in diameter than the section 10, so that the outlet end of the nozzle passage is greater than the inlet end; however, this is not an absolute requirement. It is preferred to have the section D and at least the downstream end of the section C streamlined, to avoid irregularities, and to have the high-conductivity, thin-walled tube section 14a extend at least throughout the divergent section D and, optionally, slightly upstream from the throat, as shown. It is advantageous that the outer surface of the tube section 14a be smooth, e.g., polished, to minimize the formation of a stagnant zone at which the gas temperature is considerably above that of the supersonic stream. The outlet 13 is provided with throttling means, such as a valve 20 and a gas outlet pipe 21; these parts may be constructed as shown for the parts 16—18.

Regarding the shape of the nozzle, it may be observed that the design of supersonic flow nozzles is well understood by engineers and will not, therefore, be described herein. The general principles are described by Faires in "Applied Thermodynamics," 1938, pp. 137–145 and by Shapiro in "The Dynamics and Thermodynamics of Compressible Flow," 1953, chapter 4. In brief, the supersonic nozzle is characterized by two distinct regions: In the convergent region the velocity increases and attains the speed of sound (for the local temperature and pressure condition and the characteristics of the gas) in the throat when the upstream pressure is at least as high as the critical pressure; in the divergent section the velocity continues to increase for some distance beyond the throat determined by the extent to which the discharge pressure is below the entrance pressure. The behavior in the convergent section is not influenced by the conditions prevailing downstream of the thoat. As used herein, the critical pressure ratio is the minimum ratio of the upstream critical pressure to the pressure at the exit end of the nozzle at which maximum flow occurs; it is the lowest pressure ratio for producing flow at the speed of sound in the throat.

Figure 3:
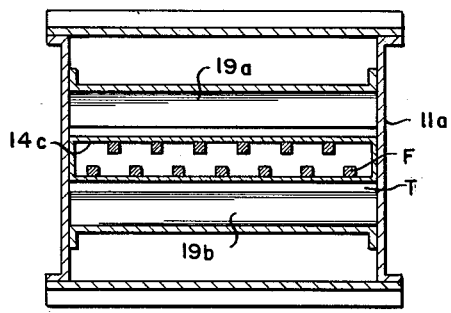
FIGURE 3 is a transverse sectional view, corresponding to FIGURE 2 showing a modified shape of the supersonic nozzle.

Supersonic nozzles may have a variety of shapes. For example, while an axially symmetrical nozzle is shown in FIGURES 1 and 2, a two-dimensional nozzle or a nozzle of other cross-sectional shape can be used. As illustrated in FIGURE 3, the nozzle 19a and the tube are rectangular in cross section. To this purpose the casing section 11a is rectangular in cross section and contains a pair of nozzle insert plates 19a, 19b which cooperate with the rectangular outlet tube 14c to form a nozzle which, in longitudinal section, would appear as shown in FIGURE 1. The throat T, as well as the convergent and divergent sections, are rectangular in cross section and the shape of the tube, which has a width several times its height, provides a large surface for heat transfer.

In operation, gas is admitted through the inlet 12 and flows through the sections C, T and D of the supersonic nozzle into the shell section 11, from which a part is discharged through the tube 14 and the remainder through the outlet 13. The pressure may be atmospheric, subatmospheric or superatmospheric, provided that the back-pressures in the final outlet pipes 18 and 21 are sufficiently below that in the inlet 12 to maintain the pressure ratio between the inlet and discharge ends of the supersonic nozzle required to insure supersonic flow. This pressure ratio across the nozzle will, in most instances, be greater than 1.5 of the critical pressure ratio and higher ratios, leading to accelerations to high Mach numbers, can be used. It will be understood that the nozzles must be designed to make effective use of the pressure ratio adopted.

The gas passes through the throat T at approximately sonic velocity and is accelerated to supersonic velocity in the divergent section D. This is accompanied by a sharp decrease in temperature, considerably in excess of Joule-Thompson cooling. Despite the inherently poor lateral mixing in such supersonic gas and the existence of a stagnant zone adjacent to the gas outlet tube 14, the latter is cooled by this gas stream. When the gas reaches the downstream end of the nozzle at which its flow passage is no longer divergent, it forms a standing shock wave W, beyond which the flow velocity is subsonic. This is accompanied by a rise in pressure and temperature which, however, remain below the values at the inlet to the nozzle. A fraction of the gas beyond the shock wave flows out through the gas outlet tube 14 and is cooled by the tube wall in the non-insulated section 14a, and flows thence through the insulated section 14b to avoid being warmed by the gas supplied at the inlet 12. The gas discharged through the pipe 18 is, therefore, colder than that discharged through the pipe 21.

Figure 4:
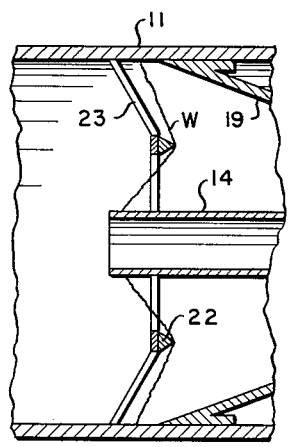
FIGURE 4 is a fragmentary view showing a wedge at the downstream end of the nozzle.

Although any abrupt change in the longitudinal contour of the flow passage or the absence of divergence usually insures the formation of the shock wave W, it is possible to mount special devices for stabilizing the location of the standing wave. This is illustrated in FIGURE 4, wherein an annular wedge ring 22 is mounted in the shell 11 by arms 23 to insure waves W.

It is evident that the operation of the apparatus is not deleteriously affected by the presence of entrained matter in the gas or by the condensation of liquid from vapor constituents in the gas.

Although a two-part shell with a nozzle insert 19 was illustrated, it should be understood that this arrangement is merely exemplary and not restrictive. Thus, it is possible to form the casing in the shape shown for the insert 19. The construction shown has the advantage of facility in assembly and in providing some thermal insulation for the nozzle, in that the annular dead space outside the nozzle and within the shell limits the influx of heat. It is evident that the shell and/or the nozzle may be provided with additional heat-insulating means.

Figure 5:
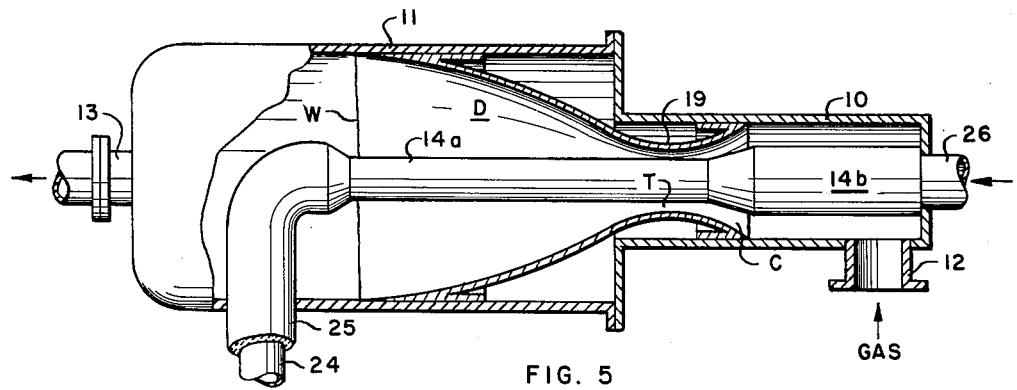
FIGURE 5 is a sectional view of a modified cooling device wherein a fluid stream different from the accelerated gas is cooled.

FIGURE 5 shows an embodiment wherein the gas is used to cool a different fluid. Parts 10—13, 14a, 14b, 19, C, D, T and W denote parts previously described. In this embodiment either or both of the valves may be omitted, and all of the gas is discharged through the outlet 13. The heat exchange tube again has a thermally conductive section 14a and may have an insulated section 14b, as shown. It is connected to a process stream outlet tube 24 which is preferably thermally insulated by a sheath 25.

In operation, the process stream to be cooled is admitted to the heat exchange tube at 26, is cooled by flow through the section 14a, and discharged through the tube 24. The gas is admitted at 12 and brought to supersonic velocity in the nozzle, as previously described. However, after passing the shock wave W all of the gas is discharged through the outlet 13.

Figure 6:
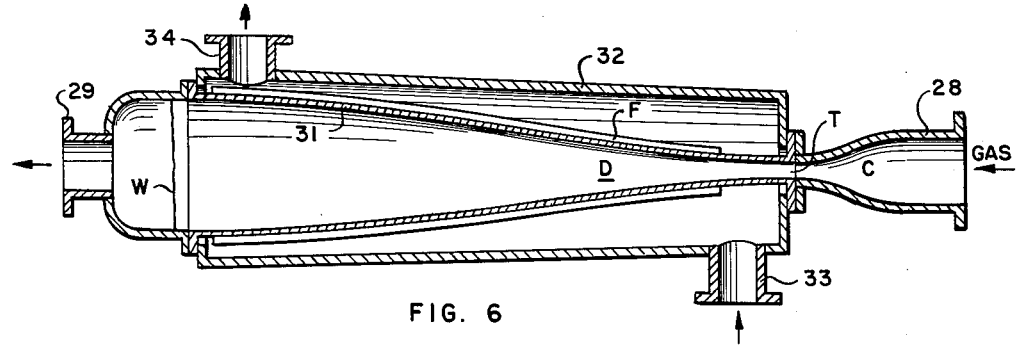
FIGURE 6 is a longitudinal sectional view of another embodiment wherein the gas is accelerated within a tube.

It is evident that other geometrical arrangements may be used. Thus, the supersonic gas stream may flow through a tube which is surrounded by the fluid stream to be cooled. This is illustrated in FIGURE 6, wherein the gas is admitted at the gas inlet 28, passed through the supersonic nozzle including convergent, throat and divergent sections C, T and D, and discharged through outlet 29, which is formed in a terminal casing section 30 joined by flanges to the thin-walled nozzle section 31 of good thermal conductivity having, preferably, external fins F. This section forms the heat exchange wall. A jacket or outer casing 32 surrounds the nozzle section 31 and is provided with an inlet 33 and an outlet 34 for the fluid to be cooled.

Operation is as was previously described, with the difference that the cold gas stream flowing at supersonic velocity within the divergent section D is surrounded by the fluid stream to be cooled. A shock wave W is formed within the terminal casing section 30, at which the gas assumed flow at sub-sonic velocity.

Figure 7:
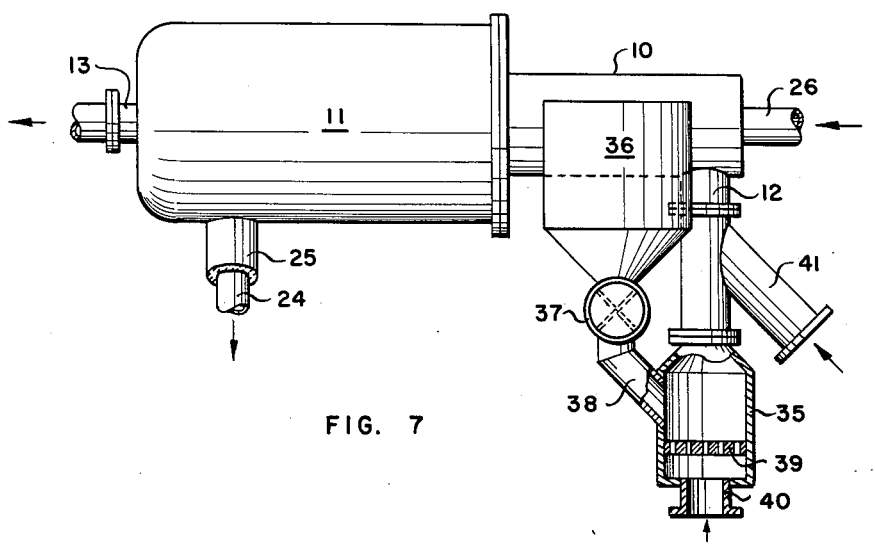
FIGURE 7 is a sectional view of still another embodiment wherein solid bodies are injected for promoting heat transfer.

FIGURE 7 shows an embodiment wherein heat exchange between the heat exchange tube and the supersonic gas stream is improved by entrainment of radiating bodies. It is applicable equally to any of the embodiments previously described, although that of FIGURE 5 was chosen for purposes of illustration. In this embodiment the parts 10—13 and 24—26 denote parts previously described. The inlet 12 is in this instance connected to an entrainment device of any suitable type. This may, for example, include an entrainment chamber 35 to which finely divided solids, such as carbon black, is supplied from a hopper 36 by a star feeder 37 through a supply pipe 38. The chamber contains a diffusion plate 39 beneath the entry port for the pipe 38 and has an inlet 40 through which gas is admitted. The solids are engaged by the gas, which may constitute the total gas supply. However, it is possible to flow only a branch of the total gas through the jet and admit the remaining part through a branch feed pipe 41.

Operation is as previously described with the difference that the solids, carried in the supersonic stream, are cooled thereby and absorb heat from the heat exchange tube 14a by radiation, thereby improving heat transfer. It is evident that the solids can, if desried, be removed from the effluent gas stream by any suitable or known means, such as a cyclone, not shown.

The amount of solids injected into the stream should be held to the minimum required to intercept the desired part of the radiation from the heat exchange tube. Thus, it is desirable that the quantity be sufficient to cause substantial absorption capacity in the supersonic stream, but any excess beyond that amount is to be avoided. The injection of an excessive amount of solids unduly increases the heat capacity of the gas stream and decreases the velocity attained, with consequent reduction in the extent of cooling.

The amount of solids to be injected can be expressed in terms of the dilution, D, which is the volume of gas (taken at the average density of the supersonic stream) for each volume of solids. D depends upon the fractional part of the radiation to be absorbed, the size of the nozzle carrying the gas and the diameter of the particles. For a nozzle having a diameter or width X and for particles having diameters $d$ (in consistent units) D is approximately $$\frac{2X}{d}$$

for 95% absorption and $$\frac{100X}{d}$$

for 5% absorption. By way of specific example, for a nozzle having a diameter of 1 cm., one part of carbon black, consisting of particles 2 microns in diameter, may be used for every 10,000 to 500,000 volumes of gas for the respective absorptions stated. In some instances, as when higher absorptions are desired, smaller nozzle sizes are used and/or larger particles are used, lower dilutions may be used; hence the dilution may typically be between 2,000 and 500,000.

*Example*

Air at 17° C. and a pressure of 90 p.s.i.g. was fed into a device providing a flow passage as shown in FIGURES 1 and 2 and was accelerated in the supersonic nozzle to Mach 3. Approximately one-fourth or more of the expanded air was discharged through the tube 14 at atmospheric pressure and had a temperature of 3° C.; the remaining gas was discharged from the outlet 21 at a temperature of about 20° C.

The effectiveness of the device is apparent from a comparison of the cooling that would result by mere expansion, known as Joule-Thompson cooling. This would have dropped the air temperature by a mere 1°, to 16° C.

I claim as my invention:

1. Method of generating cold which comprises the steps of accelerating a stream of gas by flow through a supersonic nozzle to a velocity above the local velocity of sound for the temperature and pressure conditions prevailing in the gas, and flowing said gas at the said velocity in indirect heat exchange with a fluid stream to be cooled.

2. Method according to claim 1 which includes the steps of decelerating said gas stream to sub-sonic velocity after said flow in indirect heat exchange by passage through a shock wave and thereafter using a part of the decelerated gas as the said fluid stream to be cooled.

3. Method according to claim 1 wherein the said fluid stream to be cooled is different from the said gas.

4. Method according to claim 1 wherein the said gas contains entrained therein finely divided solid particles.

5. Method according to claim 4 wherein said finely divided particles consist predominantly of carbon black having diameters between 1 and 5 microns.

6. Method according to claim 4 wherein said finely divided particles consist predominantly of carbon black having diameters between 1 and 5 microns and one part by volume thereof is present for between about 2,000 and 500,000 parts by volume of the gas, measured at the average density thereof during said flow in indirect heat exchange at supersonic velocity.

7. A supersonic gas-flow device for cooling a fluid stream which comprises wall means defining a gas-flow passageway and a confined passageway for the fluid stream to be cooled, said passageway being separated by a heat-exchange wall for the transfer of heat therethrough, said gas passageway being in the form of a supersonic nozzle which includes a convergent section, a throat and a divergent section, said heat-exchange wall bounding the said divergent section at least in part, and means for providing at entrance to said convergent section a pressure significantly in excess of the critical pressure, whereby supersonic flow occurs within said divergent section.

8. A supersonic gas-flow device according to claim 7 wherein said passageways are in intercommunication beyond the divergent section of the nozzle for the entry of a part of gas emerging from the nozzle into the confined passageway to constitute the said stream to be cooled.

9. In combination with the device according to claim 8, flow-control means for regulating the fraction of the gas emerging from the nozzle which enters the said confined passageway.

10. A supersonic gas-flow device according to claim 7 wherein said passageways are entirely isolated from each other.

11. In combination with the gas-flow device according to claim 7 a gas duct for feeding gas into said supersonic nozzle, and means for adding finely divided particulate matter into the gas entering the said nozzle for entrainment thereby.

12. A supersonic gas-flow device for dividing a gas into relatively warmer and colder fractions which comprises: wall means defining concentric elongated flow passages, one of said passages being formed as a supersonic nozzle and comprising a convergent section, a throat and a divergent section, the wall between said passages at the divergent nozzle section being a heat transfer wall, means for admitting a gas at a pressure significantly in excess of the critical pressure to the convergent end of said nozzle, whereby supersonic flow occurs within said divergent sections, a chamber in free communication with the divergent end of said nozzle passage and with one end of the other passageway, a gas outlet for said chamber, and flow-control means for regulating the ratio of the gas streams discharged from said chamber respectively through said outlet and through the passage other than the said nozzle.

References Cited in the file of this patent

UNITED STATES PATENTS

| | | |
|---|---|---|
| 1,765,657 | Coffey | June 24, 1930 |
| 2,441,279 | McCollum | May 11, 1948 |

FOREIGN PATENTS

| | | |
|---|---|---|
| 307,359 | Germany | Aug. 17, 1918 |
| 482,104 | Canada | Apr. 1, 1952 |
| 698,598 | Germany | Nov. 13, 1940 |
| 754,609 | France | Aug. 28, 1933 |